(12) United States Patent
Tanaka et al.

(10) Patent No.: US 11,491,896 B2
(45) Date of Patent: Nov. 8, 2022

(54) SEAT

(71) Applicant: TS TECH CO., LTD., Asaka (JP)

(72) Inventors: Soichiro Tanaka, Shioya-gun (JP); Ryuta Kashino, Shioya-gun (JP); Chase Hemmelgarn, Reynoldsburg, OH (US); Takamasa Sonoda, Shioya-gun (JP); Takanori Yamaguchi, Shioya-gun (JP); Ryutaro Otsuka, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 284 days.

(21) Appl. No.: 16/858,074

(22) Filed: Apr. 24, 2020

(65) Prior Publication Data
US 2020/0343766 A1 Oct. 29, 2020

Related U.S. Application Data

(60) Provisional application No. 62/837,867, filed on Apr. 24, 2019, provisional application No. 62/837,770, filed on Apr. 24, 2019.

(51) Int. Cl.
| *B60N 2/14* | (2006.01) |
| *B60R 16/027* | (2006.01) |
| *H02J 50/10* | (2016.01) |
| *B60R 16/023* | (2006.01) |

(52) U.S. Cl.
CPC .............. *B60N 2/14* (2013.01); *B60R 16/023* (2013.01); *B60R 16/027* (2013.01); *H02J 50/10* (2016.02)

(58) Field of Classification Search
CPC .......... H20J 50/10; H20J 50/40; H20J 50/402; H20J 50/90; B60R 16/023; B60R 16/03; B60R 16/027; B60R 16/00; B60N 2/14; B60N 2/5678; H02J 50/10; H02J 50/40; H02J 50/402; H02J 50/90
USPC ....................................................... 296/65.06
See application file for complete search history.

(56) References Cited

U.S. PATENT DOCUMENTS

| 4,468,051 A * | 8/1984 | Kobayashi ............. B60N 2/143 280/751 |
| 7,850,242 B2 * | 12/2010 | Taguchi ................. B60N 2/146 297/344.23 |
| 2020/0269784 A1 * | 8/2020 | Michalak ............... B60N 2/062 |

FOREIGN PATENT DOCUMENTS

| JP | 2017-210090 A | 11/2017 |
| WO | 2005/095147 A1 | 10/2005 |

* cited by examiner

*Primary Examiner* — Dennis H Pedder
(74) *Attorney, Agent, or Firm* — Oliff PLC

(57) ABSTRACT

A seat including: a seat body in which a person is seated; a seat supporter supporting the seat body on a floor; and a wireless power feeder that is provided between the floor and the seat body, and transmits electric power, which is received from a power source, from a floor side to a seat body side in a contactless manner. The seat supporter includes a rotation mechanism that rotates the seat body in a lateral direction, the wireless power feeder includes: a power transmitter provided to the floor and connected to the power source; and a power receiver that is provided in the seat body and receives the electric power from the power transmitter, and the power transmitter and the power receiver are arranged in a state in which the power transmitter and the power receiver always overlap with each other as viewed from above or below.

7 Claims, 12 Drawing Sheets

SEAT

BACKGROUND OF THE INVENTION

1. Technical Field of the Invention

The present invention relates to a seat.

2. Description of Related Art

There is disclosed, for example, in Patent Document (WO 2005/095147 A1) a vehicle seat which is capable of causing a seat body to face a rear seat by rotating the seat body 180 degrees in the opposite direction.

This vehicle seat is configured to be rotatable in accordance with the seating direction of the front and rear seats by a turn table which is attached to upper rails of slide rails.

When the rotation of seat body is to be performed electrically, in order to supply electric power to the seat body from a power circuit provided in the vehicle body, the power circuit and the seat body need to be connected to each other with a harness including an electric wire. However, when the power circuit and the seat body are connected to each other with a harness, the harness may interfere with the rotation of the seat body.

Thus, using a contactless power feeding device (also referred to as wireless power feeding) to perform in a contactless manner the power feeding to the seat body of the vehicle seat from the vehicle body is considered. However, under the present circumstances, the distance between the power transmitting side and the power receiving side is limited. That is, there is a problem that, when the positional relationship between the power transmitter and the power receiver is out of the range allowing the transmission of electric power at the time of rotation of seat body, the power feeding to the seat body is not performed and the seat body cannot be rotated.

SUMMARY OF THE INVENTION

An object of the present invention is to surely perform power supply to a seat body of a vehicle seat configured to be rotatable, and to smoothly rotate the seat body.

According to a first aspect of the present invention, there is provided a seat including:
a seat body in which a person is seated;
a seat supporter that supports the seat body on a floor; and
a wireless power feeder that is provided between the floor and the seat body, and transmits electric power from a floor side to a seat body side in a contactless manner, the electric power being received from a power source, in which
the seat supporter includes a rotation mechanism that rotates the seat body in a lateral direction,
the wireless power feeder includes:
a power transmitter that is provided to the floor and connected to the power source; and
a power receiver that is provided in the seat body and receives the electric power from the power transmitter, and
the power transmitter and the power receiver are arranged in a state in which the power transmitter and the power receiver always overlap with each other as viewed from above or below.

BRIEF DESCRIPTION OF THE DRAWINGS

The accompanying drawings are not intended as a definition of the limits of the present invention but illustrate embodiments of the present invention, and together with the general description given above and the detailed description of the embodiments given below, serve to explain the principles of the present invention, wherein.

DESCRIPTION OF THE PREFERRED EMBODIMENTS

Hereinafter, embodiments of the present invention will be described with reference to the drawings. Although a variety of limitations that are technically favorable for carrying out the present invention are put on the embodiments below, the technical scope of the present invention is not limited to the embodiments or illustrated examples below.

First Embodiment

Figure 1:
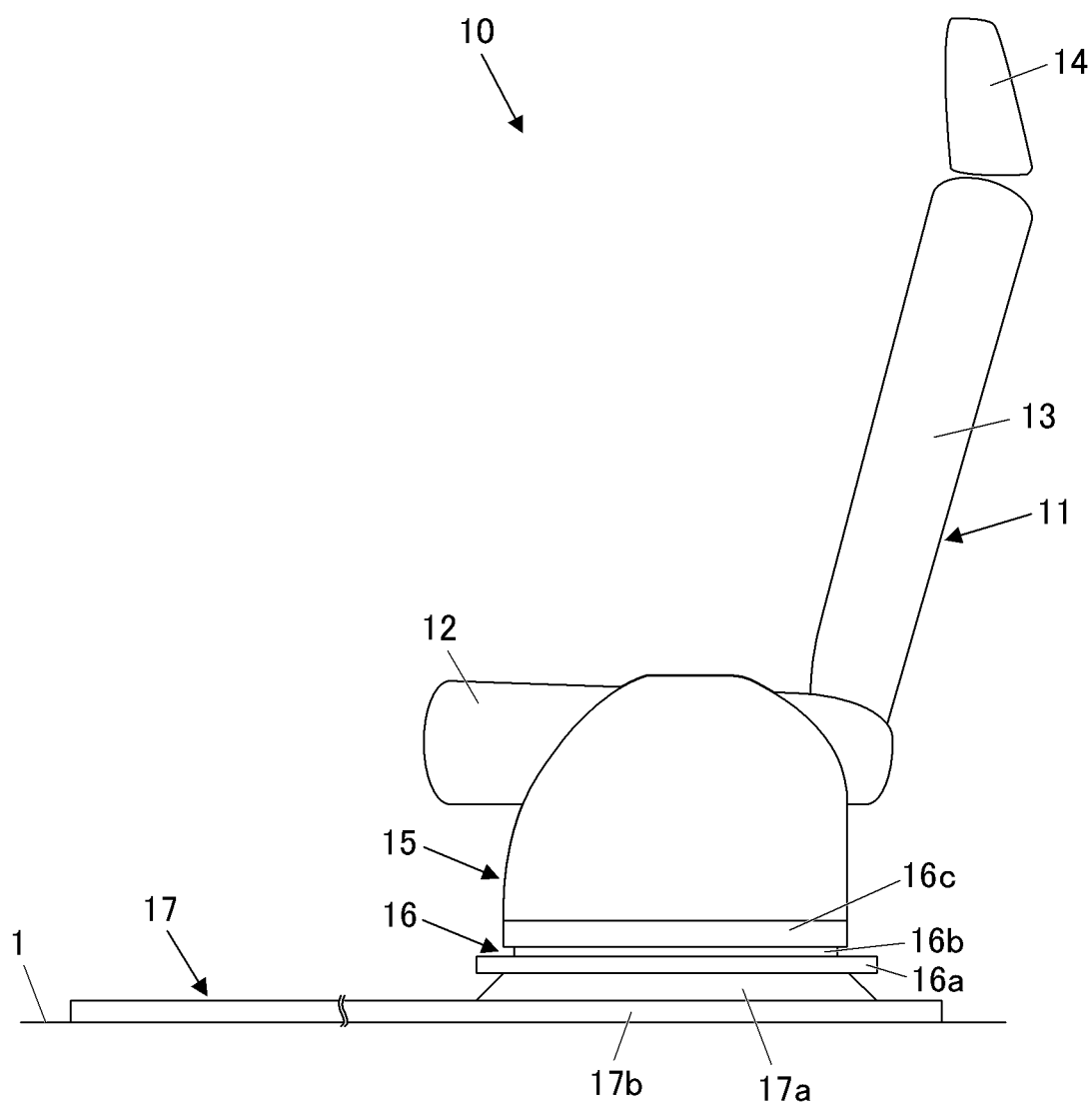
FIG. 1 is a lateral surface view of a seat in a first embodiment.
Figure 2:
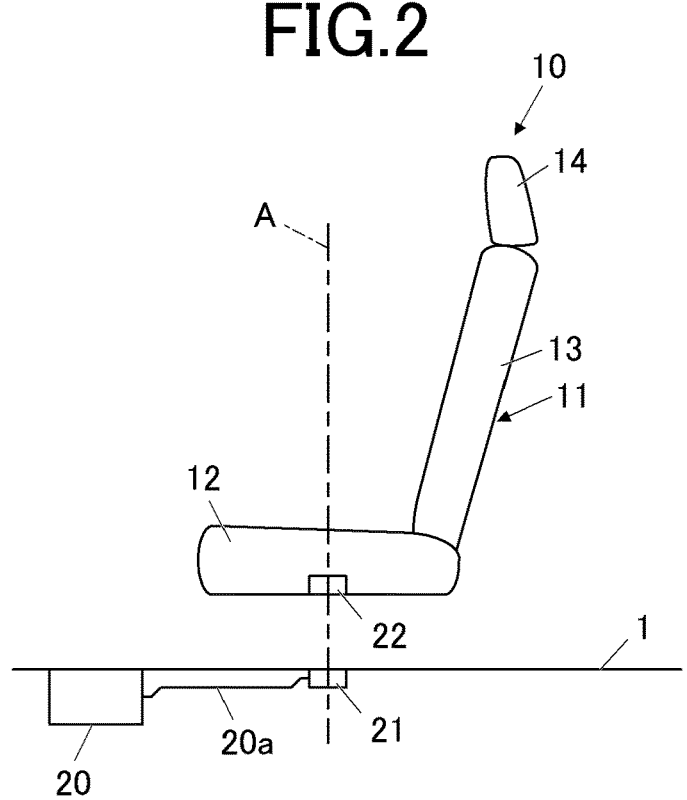
FIG. 2 is a view for explaining the position of a rotation axis and the positions of a power transmitter and a power receiver.

The reference numeral 1 in FIGS. 1 and 2 indicates the floor of a vehicle such as an automobile including a passenger car. A seat 10 for a person to be seated is set on the floor 1. The seat 10 in the present embodiment is a rotary seat which rotates in a lateral direction (for example, horizontally rotates) with respect to the floor 1 around the rotation axis A.

The seat 10 in the present embodiment is set in the passenger car. However, the present invention is not limited to this, and the seat 10 may be set in other automobiles such as a bus and a truck, or may be set in vehicles other than the automobiles such as a railroad car, a ship and an aircraft. The automobile in which the seat 10 is set may be an automobile which can run with switching between an automatic driving mode and a manual driving mode, and the seat 10 can rotate during the automatic driving mode and rotate during stopping or parking in the manual driving mode.

The seat 10 includes a seat body 11 in which a person is seated, and a seat supporter 15 which supports the seat body 11 on the floor 1. The seat supporter 15 has a rotation mechanism 16 for rotating the seat body 11 in the lateral direction, and a slide mechanism 17 for sliding the seat body 11 in the front-rear direction of the vehicle.

The rotation mechanism 16 includes a base table 16a which is attached to and supported by upper rails 17a (to be described later) in the slide mechanism 17, a lower table 16b on the fixed side which is set on the plate surface of the base table 16a, and an upper table 16c on the rotation side which rotates with respect to the lower table 16b. The body of the seat supporter 15 supporting the seat body 11 is fixed to the upper surface of the upper table 16c.

The slide mechanism 17 is slide rails and fixed to the floor 1. Such a slide mechanism 17 includes the upper rails 17a attached to the rotation mechanism 16 and lower rails 17b fixed to the floor 1. The lower rails 17b are formed to be long along the front-rear direction of the vehicle. The upper rails 17a can slide along the length direction of the lower rails 17b.

The rotation mechanism 16 includes a lock mechanism not shown in the drawings, and the rotation mechanism 16 can stop the rotation at an arbitrary position when the lock mechanism is in the locked state, and the rotation mechanism 16 can perform rotation when the lock is released. The slide mechanism 17 similarly includes a lock mechanism not shown in the drawings, and the slide mechanism 17 can stop sliding at an arbitrary position when the lock mechanism is in the locked state and the slide mechanism 17 can perform sliding when the lock is released.

A control device (ECU: Electric Control Unit) for operating the above rotation mechanism 16 and the lock mechanism, the slide mechanism 17 and the lock mechanism, and an after-mentioned reclining mechanism is provided in the seat 10, and the mechanisms 16 and 17 and the control device are communicably connected to each other.

The seat body 11 at least includes: a seat cushion 12 that supports the buttocks and the thigh of a person; a seat back 13 that serves as a backrest; and a head rest 14 that supports the head of the person. Though not shown in the drawings, the seat body 11 may include arm rests that support the arms of the person, a foot rest that supports the feet of the person; an ottoman that supports the legs of the person; a neck rest that supports the neck of the person, and the like.

The reclining mechanism not shown in the drawings is provided between the rear end of the seat cushion 12 and the lower end of the seat back 13, and the seat back 13 can be reclined with respect to the seat cushion 12. The position of the head rest 14 can be adjusted with respect to the upper end of the seat back 13 at least in the up-down direction. The position in the front-rear direction may be adjustable in addition to the position adjustment in the up-down direction.

The rotation axis A of the rotation mechanism 16 in the seat supporter 15 is located in the center of the seat cushion 12, and the seat body 11 rotates in a lateral direction around the rotation axis A. In the present embodiment, a door of the vehicle is provided on the right side of the seat 10, and another seat is set on the left side. In this case, the seat body 11 rotates toward the left side.

The seat 10 includes a wireless power feeder for transmitting electric power, which was received from a power source 20 provided at an arbitrary location of the vehicle, from the floor 1 side to the seat body 11 side in a contactless manner, the wireless power feeder being provided between the floor 1 and the seat body 11.

The power source 20 is provided below the floor 1, and a battery for vehicle (that is, auxiliary machinery battery) is used, for example. However, the present invention is not limited to this, and a battery for running in a hybrid car and a battery dedicated for the power source 20 may be used.

The wireless power feeder includes: a power transmitter 21 that is provided below the floor 1 and connected to the power source 20 via a harness 20a including an electric wire; and a power receiver 22 that is provided in the seat body 11 and receives electric power transmitted from the power transmitter 21. The power receiver 22 is provided on the lower surface side in the center of the seat cushion 12 in the seat body 11, and the power transmitter 21 is provided under the seat cushion 12 in the lower side of the floor 1.

The power feeding method by the wireless power feeder is what is called an electromagnetic induction method, and the power transmitter 21 and the power receiver 22 are respectively a power transmitting coil and a power receiving coil. When an alternating current flows from the power source 20 to the power transmitter 21, a magnetic field is generated between the power transmitter 21 and the power receiver 22. When the power receiver 22 receives the magnetic field, an induced voltage is generated on the power receiver 22 side, and an electric current is generated.

The power receiver 22 is connected to the rotation mechanism 16 and the slide mechanism 17 of the seat supporter 15, and the reclining mechanism with a harness (not shown in the drawings) including an electric wire, and power supply to each of the mechanisms can be performed. That is, the power receiver 22 functions as a power distributer. Each of the mechanisms 16 and 17 that received the power supply from the power receiver 22 is controlled by the above mentioned control device to operate as needed.

Figure 3:
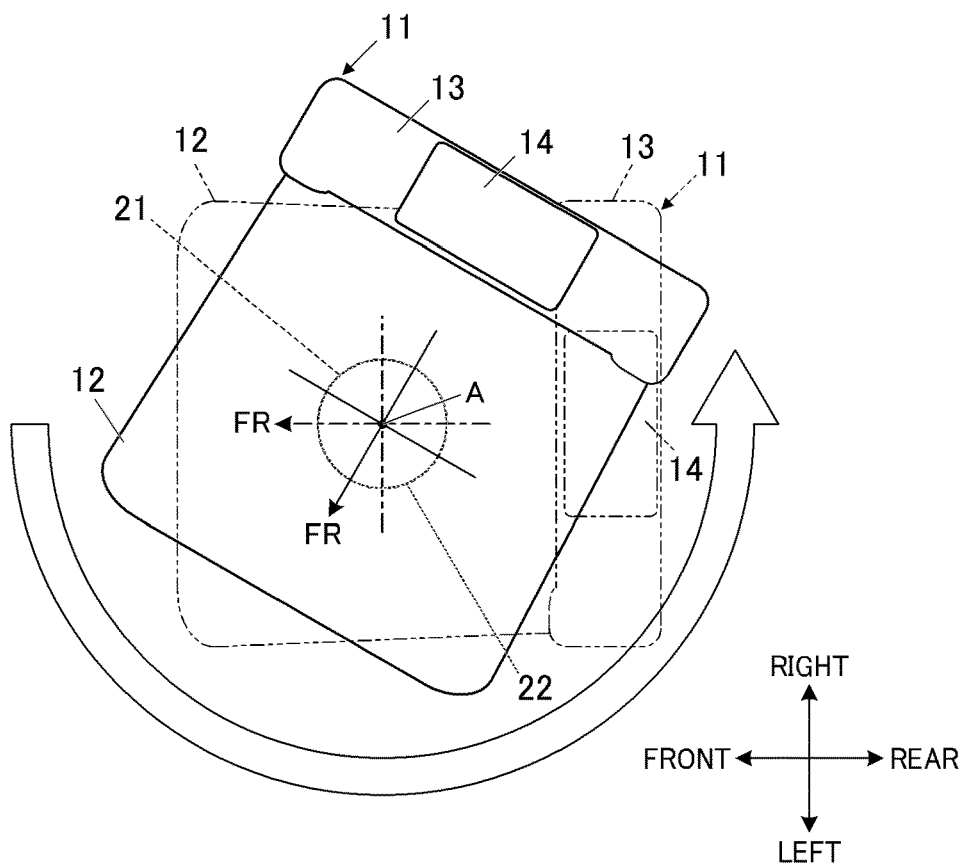
FIG. 3 is a view for explaining the position of the rotation axis, the positions of the power transmitter and the power receiver, and a rotation manner of the seat.

To describe the positional relationship between the power transmitter 21 and the power receiver 22 in the present embodiment in more detail, as shown in FIGS. 2 and 3, the central axes of the power transmitter 21 and the power receiver 22 are arranged on the rotation axis A of the rotation mechanism 16.

In the cross arrow described in FIG. 3, the line indicating the front-rear direction of the seat cushion 12 and the line indicating the left-right direction cross each other, and the tip of the arrow (indicated by "FR") indicates the direction where the front end of the seat body 11 exists. In FIG. 3, the line indicating the front-rear direction in the cross arrow is identical to the central line passing through the center in the left-right direction in the seat cushion 12. The cross arrow of chain double-dashed line indicates the direction before movement of the seat body 11, and the cross arrow of the solid line indicates the direction after movement of the seat body 11.

The power transmitter 21 and the power receiver 22 are arranged in a state in which the power transmitter 21 and the power receiver 22 always overlap with each other as viewed from above or below. In other words, the power transmitter 21 and the power receiver 22 are in a state of overlapping with each other as viewed from above or below during both the rotation and stopping of the seat body 11.

Thus, the seat body 11 can make 180-degree (or 360-degree) rotation unless the seat body 11 is interfered with by other portions in the vehicle body, and the person seated in the seat 10 can turn his/her body sideward and backward. Thus, the person can see views through windows on lateral and back sides of the vehicle, and face and communicate with people sideward and backward.

Though the central axes of the power transmitter 21 and the power receiver 22 are located on the rotation axis A of the rotation mechanism 16 in the present embodiment, when the power transmitter 21 and the power receiver 22 themselves are located on the rotation axis A of the rotation mechanism 16, 180-degree (or 360-degree) rotation can be performed similarly.

The embodiment disclosed herein is not intended to limit the present invention but are merely examples in every respect. The scope of the present invention should be interpreted not by the embodiments above but by the scope of claims below, and is intended to include equivalents in meaning of the scope of claims and any changes within the scope of claims.

Configuration Examples of First Embodiment

Hereinafter, configuration examples 1 to 7 in the first embodiment will be described. The configuration examples described below may be combined when the combinations are possible. In each of the configuration examples below, as for the common elements with the above first embodiment, the common reference numerals are provided and the explanation thereof is omitted or simplified.

Configuration Example 1

Figure 4:
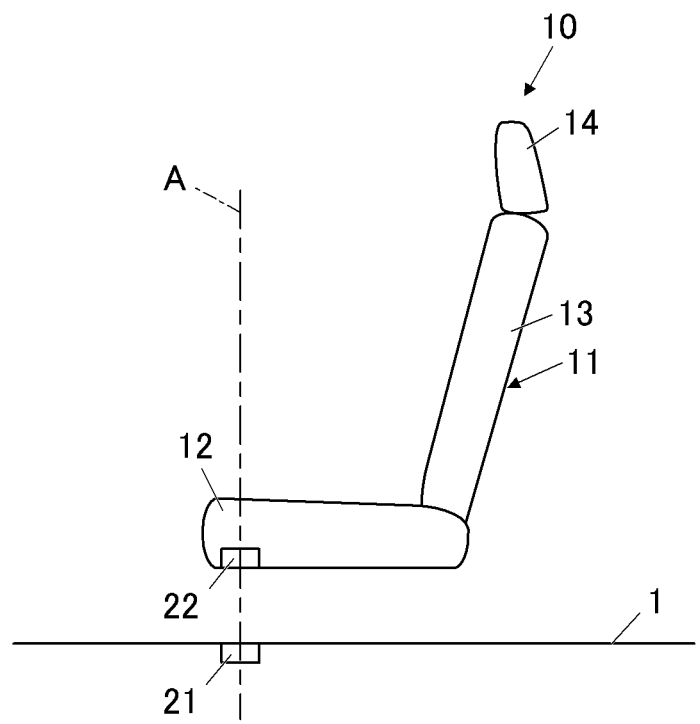
FIG. 4 is a view for explaining another example of the position of the rotation axis, and the positions of the power transmitter and the power receiver.

In the seat 10 shown in FIG. 4, the rotation axis A of the rotation mechanism 16 is located in the center of the front end of the seat cushion 12. That is, the rotation axis A of the rotation mechanism 16 is located on the central line passing through the center of the left-right direction in the seat cushion 12.

The central axes of the power transmitter 21 and the power receiver 22 are arranged on the rotation axis A. Thus, the seat body 11 rotates in such a manner as swinging the rear end side of the seat cushion 12.

Configuration Example 2

Figure 5:
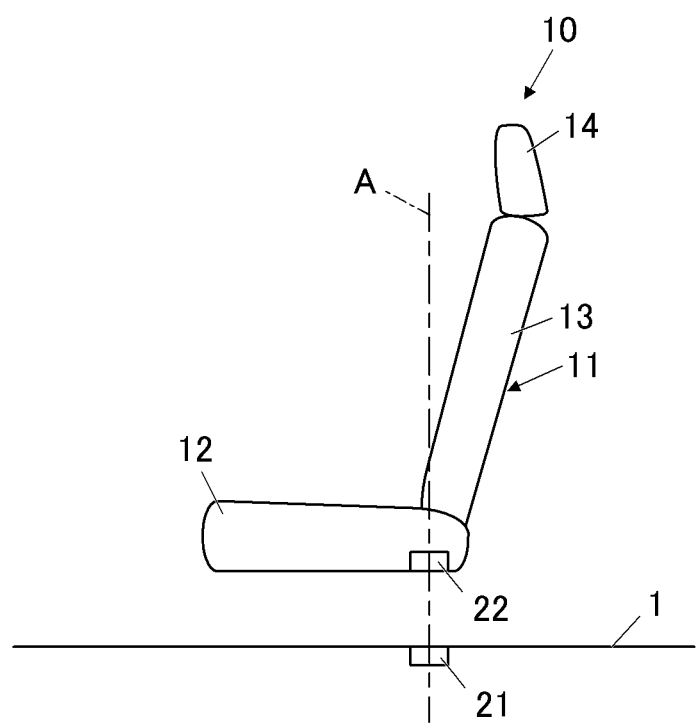
FIG. 5 is a view for explaining another example of the position of the rotation axis, and the positions of the power transmitter and the power receiver.

In the seat 10 shown in FIG. 5, the rotation axis A of the rotation mechanism 16 is located in the center of the rear end of the seat cushion 12. That is, the rotation axis A of the rotation mechanism 16 is located on the central line passing through the center of the left-right direction in the seat cushion 12.

The central axes of the power transmitter 21 and the power receiver 22 are arranged on the rotation axis A. Thus, the seat body 11 rotates in such a manner as swinging the front end side of the seat cushion 12.

Configuration Example 3

Figure 6:
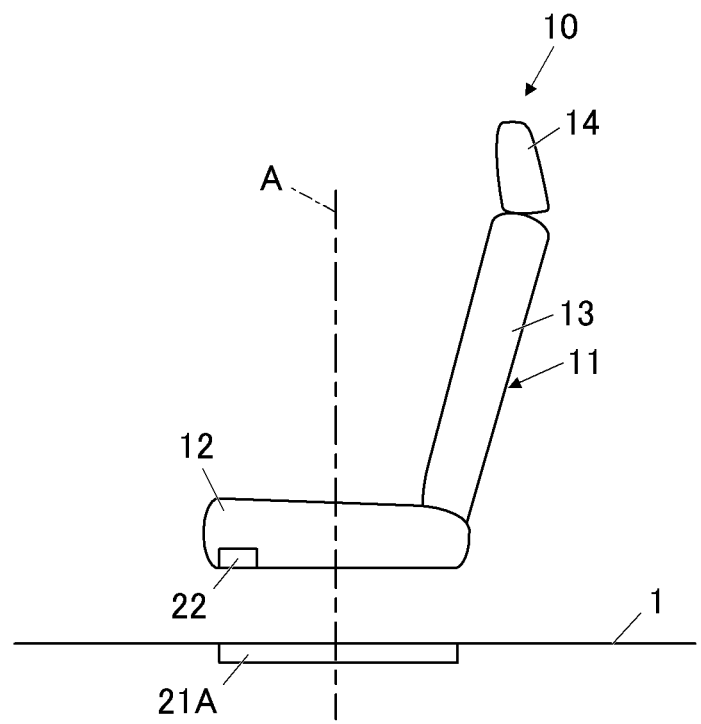
FIG. 6 is a view for explaining another example of the position of the rotation axis, and the positions of the power transmitter and the power receiver.

In the seat 10 shown in FIG. 6, the area of the power transmitter 21A is formed to be wider than the area of the power receiver 22. To describe in more detail, the power transmitter 21A is set to have such an area that can cover the orbit of the rotation of the power receiver 22 accompanying the rotation of the seat body 11. When the orbit of the rotation of the power receiver 22 can be covered, it is possible to always supply electric power to the power receiver 22.

Configuration Example 4

Figure 7:
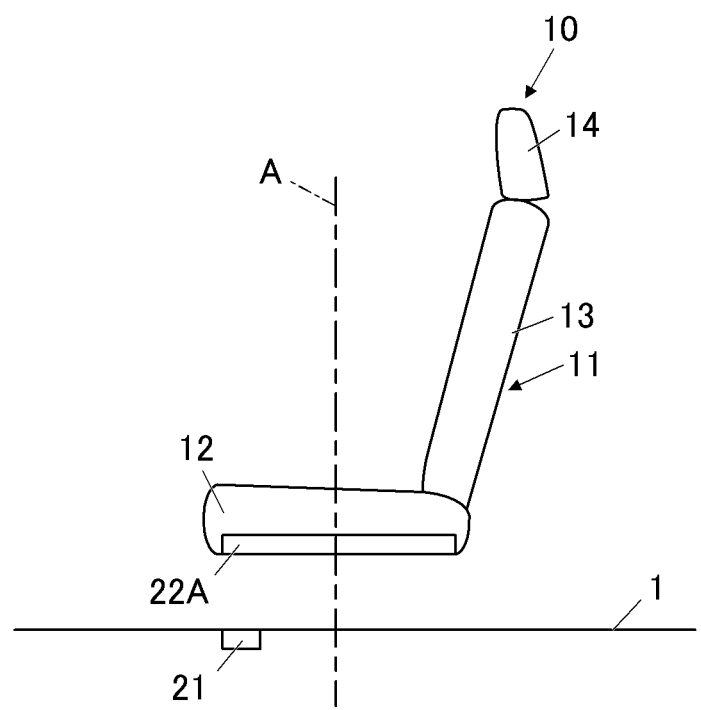
FIG. 7 is a view for explaining another example of the position of the rotation axis, and the positions of the power transmitter and the power receiver.

In the seat 10 shown in FIG. 7, the area of the power receiver 22A is formed to be wider than the area of the power transmitter 21. To describe in more detail, the power receiver 22A is set to have such an area that does not get out of the position of the power transmitter 21 when the power receiver 22A rotates accompanying the rotation of the seat body 11. When the power receiver 22A is set to have such an area as not getting out of the position of the power transmitter 21, it is possible to always receive electric power from the power transmitter 21.

Configuration Example 5

Figure 8:
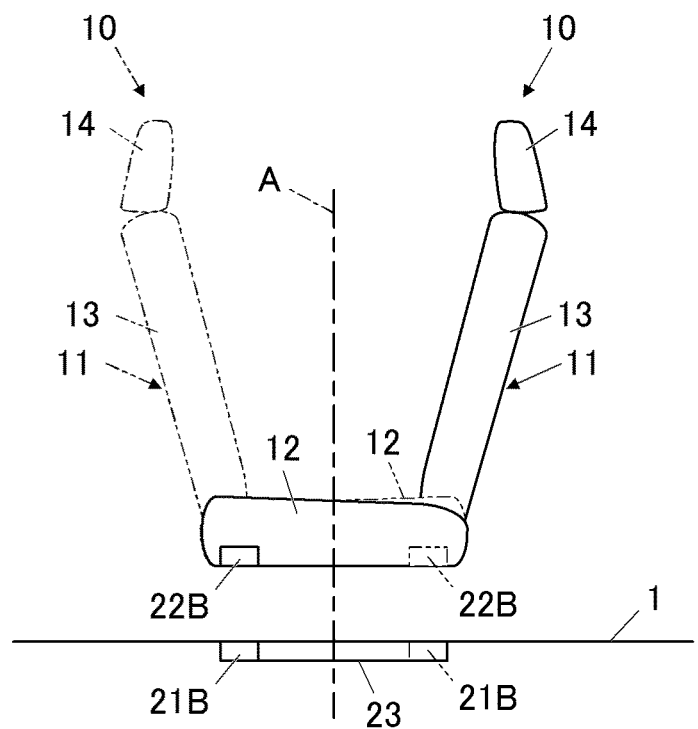
FIG. 8 is a view for explaining another example of the position of the rotation axis, and the positions of the power transmitter and the power receiver.

The seat 10 shown in FIG. 8 has a configuration in which the power transmitter 21B follows the movement of the power receiver 22B accompanying the rotation of the seat body 11. In the present configuration example, the power transmitter 21B and the power receiver 22B are arranged out of the rotation axis A of the rotation mechanism 16. In order to achieve this configuration, the floor 1 is provided with a rail 23 for the power transmitter 21B that follows the movement of the power receiver 22B. Thus, the power transmitter 21B can always supply electric power to the power receiver 22B.

The rail 23 is formed in an arc or a circle such that the rail 23 covers the orbit of the power receiver 22B accompanying the rotation of the seat body 11. The power transmitter 21B can move along the rail 23 that is formed in such a way.

The motion power when the power transmitter 21B follows the movement of the power receiver 22B can be obtained from the power source 20, and the control when the power transmitter 21B follows the movement of the power receiver 22B may be performed by the above control device or a control device (ECU device) provided on the vehicle body side, or the control devices may cooperate to perform the control.

Configuration Example 6

Figure 9:
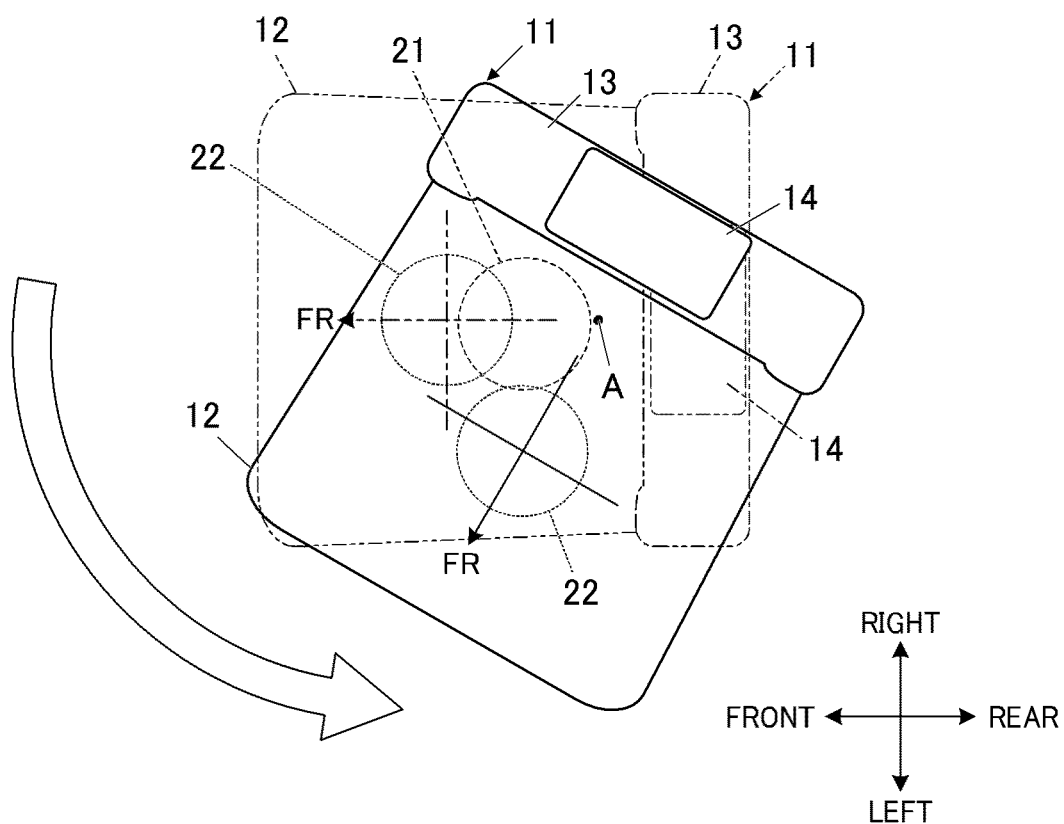
FIG. 9 is a view for explaining another example of the position of the rotation axis, the positions of the power transmitter and the power receiver, and the rotation manner of the seat.

In the seat 10 shown in FIG. 9, the power transmitter 21 and the power receiver 22 are arranged out of the rotation axis A of the rotation mechanism 16. Furthermore, the seat body 11 rotates, by the rotation mechanism 16, in the range capable of maintaining the state in which the power transmitter 21 and the power receiver 22 overlap with each other.

That is, as for the rotation angle of the rotation mechanism 16, as described above, the rotation of 180 and 360 degrees can be performed, however, the power receiver 22 cannot receive electric power from the power transmitter 21 unless the overlapping state between the power transmitter 21 and the power receiver 22 can be maintained. Thus, when the power transmitter 21 and the power receiver 22 are arranged out of the rotation axis A of the rotation mechanism 16, the rotation angle of the rotation mechanism 16 is smaller than 180 degrees.

In the arrangement of the power transmitter 21 and the power receiver 22 with respect to the rotation axis A as shown in FIG. 9, the rotation angle of the rotation mechanism is approximately 60 degrees at a maximum, and further rotation does not allow the power receiver 22 to overlap with the power transmitter 21.

The rotation angle of such a rotation mechanism 16 can be modified as needed according to the distance (interval) between each of the power transmitter 21 and the power receiver 22 and the rotation axis A, the distance (interval) between the power transmitter 21 and the power receiver 22, and the areas (ranges) of the power transmitter 21 and the power receiver 22.

The cross arrow described in FIG. 9 is similar to the cross arrow described in FIG. 3, the line indicating the front-rear direction of the seat cushion 12 and the line indicating the left-right direction cross each other, and the tip of the arrow (indicated by "FR") indicates the direction where the front end of the seat body 11 exists.

Configuration Example 7

Though a single power transmitter 21 and a single power receiver 22 are provided in the above embodiment and configuration examples, the number of the power transmitter(s) 21 and the power receiver(s) 22 is not limited to this, and there may be provided a plurality of power transmitters 21 and/or a plurality of power receivers 22. When a plurality of power transmitters 21 and/or a plurality of power receivers 22 are provided, they are arranged according to the rotation orbit of the seat body 11 (power receiver 22).

When a plurality of power transmitters 21 and/or a plurality of power receivers 22 are provided in such a way, it is desirable to provide an electromagnetic shield suppressing unnecessary deformation of the magnetic field or a sufficient interval between adjacent power transmitters 21 or adjacent power receivers 22.

According to the above embodiment and each of the configuration examples, the power transmitter(s) that is provided on the floor 1 side and connected to the power source 20 and the power receiver(s) that receives electric power from the power transmitter(s) 21 are arranged in a state of always overlapping with each other as viewed from above or below. Thus, the power transmitter(s) 21 and the power receiver(s) 22 can be in the state of overlapping with each other during both the rotation of the seat body 11 and the stopping of the seat body 11. Thus, it is possible to surely perform power supply to the seat body 11, and omit the harness for power supply and smoothly rotate the seat body 11.

By at least one of the power transmitter 21 and the power receiver 22 being arranged on the rotation axis A of the rotation mechanism 16, even when the seat body 11 rotates around the rotation axis A of the rotation mechanism 16, it is possible to always maintain the state in which the power transmitter 21 and the power receiver 22 overlap with each other.

By the power transmitter 21 and the power receiver 22 being arranged out of the rotation axis A of the rotation mechanism 16, it is possible to arrange the power transmitter 21 and the power receiver 22 at appropriate positions according to the internal structure of the floor 1 and the internal structure of the seat body 11. Thus, a wireless power feeder can be easily incorporated into the seat 10.

By one of the power transmitter 21 (21A) and the power receiver 22 (22A) being arranged on the rotation axis A of the rotation mechanism 16, the other being arranged out of the rotation axis A of the rotation mechanism 16, and the one that is arranged on the rotation axis A of the rotation mechanism 16 being formed to have a wider area than the area of the other that is arranged out of the rotation axis A of the rotation mechanism 16, it is possible to arrange the other that has a smaller area at an appropriate position according to the internal structure of the floor 1 and the internal structure of the seat body 11, and always maintain the state in which the power transmitter 21 and the power receiver 22 overlap with each other.

By the rotation axis A of the rotation mechanism 16 being located on the central line passing through the center in the left-right direction in the seat cushion 12, the seat body 11 can easily rotate even in a space of a limited size as in the vehicle body of an automobile, for example, and it is possible to contribute to smoothly rotating the seat body 11, together with the wireless power feeder.

By the rotation axis A of the rotation mechanism being located in the center of the central line, the rotation range (radius of orbit) of the seat cushion 12 is small. Thus, the seat body 11 can easily rotate, and it is possible to further contribute to smoothly rotating the seat body 11.

By the rotation axis A of the rotation mechanism 16 being located out of the center of the central line, the person seated in the seat body 11 does not easily feel uncomfortable. Furthermore, it is possible to rotate the seat body 11 even when the rotation axis A of the rotation mechanism 16 cannot be located in the center of the central line.

By the power transmitter 21B following the movement of the power receiver 22B accompanying the rotation of the seat body 11 and the floor 1 being provided with the rail(s) for the power transmitter 22 that follows the movement of the power receiver 22B, it is possible to always maintain the state in which the power transmitter 21 and the power receiver 22 overlap with each other irrespective of the arrangement positions of the power transmitter 21 and the power receiver 22.

Since the seat body 11 rotates in the range capable of maintaining the state in which the power transmitter 21 and the power receiver 22 overlap with each other by the rotation mechanism 16, it is possible to always maintain the state in which the power transmitter 21 and the power receiver 22 overlap with each other in the rotation angle of the seat body 11 that is narrowed to a fixed range.

The seat supporter 15 includes a slide mechanism 17 for sliding the seat body 11 in the front-rear direction of the floor 1, and it is possible to perform various seat arrangements by using the slide mechanism 17 together with the rotation mechanism 16. Furthermore, it is possible to adjust the interval with the back seat with the slide mechanism 17 when the seat body 11 is rotated backward to face a person (people) in the back for communication.

Second Embodiment

Next, the second embodiment will be described with reference to the drawings. For convenience of explanation, the description will be made by providing same reference numerals to common parts with the first embodiment.

Patent Document 2 (JP 2017-210090 A), for example, discloses a conventional technique of using a contactless power feeding device that is incorporated into slide rails and performing the power feeding to the seat body of the vehicle seat from the vehicle body in a contactless manner. By performing contactless power feeding to the seat body from the vehicle body in such a way, the electric wire connecting the vehicle body to the seat body can be omitted. Thus, it is possible to smoothly move the seat body along the slide rails.

Such a contactless power feeding device transmits electric power with a power transmitter that is provided integrally with lower rails in the slide rails and formed to be long to the same degree as the length from one end to the other end in the longitudinal direction of the lower rails. When the power transmitter is formed to be long in such a way, power feeding can be performed at any position even when the seat body slides along the slide rails, however, the cost could be high.

Thus, in the present embodiment, a seat that allows power feeding at any position when the seat body moves and that enables reduction in cost will be described.

According to a first invention in a seat of the present embodiment, a seat includes:
  a seat body in which a person is seated;
  a seat supporter that supports the seat body on the floor; and
  a wireless power feeder that is provided between the floor and the seat body, and transmits electric power from a floor side to a seat body side in a contactless manner, the electric power being received from a power source,
  the seat supporter includes a movement mechanism that moves the seat body along the floor,
  the wireless power feeder includes:
    a power transmitter that is located on the floor side and connected to the power source; and
    a power receiver that is located on the seat body side and moves accompanying the seat body, and receives the electric power from the power transmitter, and
  the power transmitter and the power receiver are arranged in a state in which the power transmitter and the power receiver always overlap with each other for at least a minimum power receivable range as viewed from above or below.

According to a second invention in the seat of the present embodiment, in the first invention, the wireless power feeder includes a plurality of power transmitters and/or a plurality of power receivers, each of the power transmitters and the power receivers being the power transmitter and the power receiver respectively, and the plurality of power transmitters and/or the plurality of power receivers are arranged at an interval along a movement direction of the seat body.

According to a third invention in the seat of the present embodiment, in the second invention, the movement mechanism is a slide mechanism that slides the seat body along the floor, and includes a lower rail which is located on the floor side and an upper rail which is located on the seat body side and slidable along a length direction of the lower rail, and the plurality of power transmitters are provided to the lower rail and arranged at an interval in the length direction of the lower rail.

According to a fourth invention in the seat of the present embodiment, in the third invention, a length of the power transmitter along the movement direction of the seat body is set to be equal to a length of the power receiver along the movement direction of the seat body.

According to a fifth invention in the seat of the present embodiment, in the fourth invention, the interval between the power transmitters is set to be shorter than the length of the power receiver along the movement direction of the seat body for the minimum power receivable range.

According to a sixth invention in the seat of the present embodiment, in the fourth invention, the wireless power feeder includes the plurality of power receivers and the power receivers are arranged at the interval in the movement direction of the seat body, and the interval between the power receivers is set to have a different length from the interval between the power transmitters.

According to a seventh invention in the seat of the present embodiment, in the first invention, the movement mechanism is a slide mechanism that slides the seat body along the floor, and includes a lower rail which is located on the floor side and an upper rail which is located on the seat body side and slidable along a length direction of the lower rail, and
the power transmitter is provided to the lower rail and follows a movement of the power receiver that accompanies a movement of the seat body.

According to an eighth invention in the seat of the present embodiment, in the second invention, the movement mechanism is a rotation mechanism that rotates the seat body in a lateral direction.

According to a ninth invention in the seat of the present embodiment, in the first invention, the power transmitter and/or the power receiver includes a different function from wireless power feeding.

According to a tenth invention in the seat of the present embodiment, in the ninth invention, the power receiver includes a heating wire that is wound to be coiled and generates heat by being energized.

Figure 10:
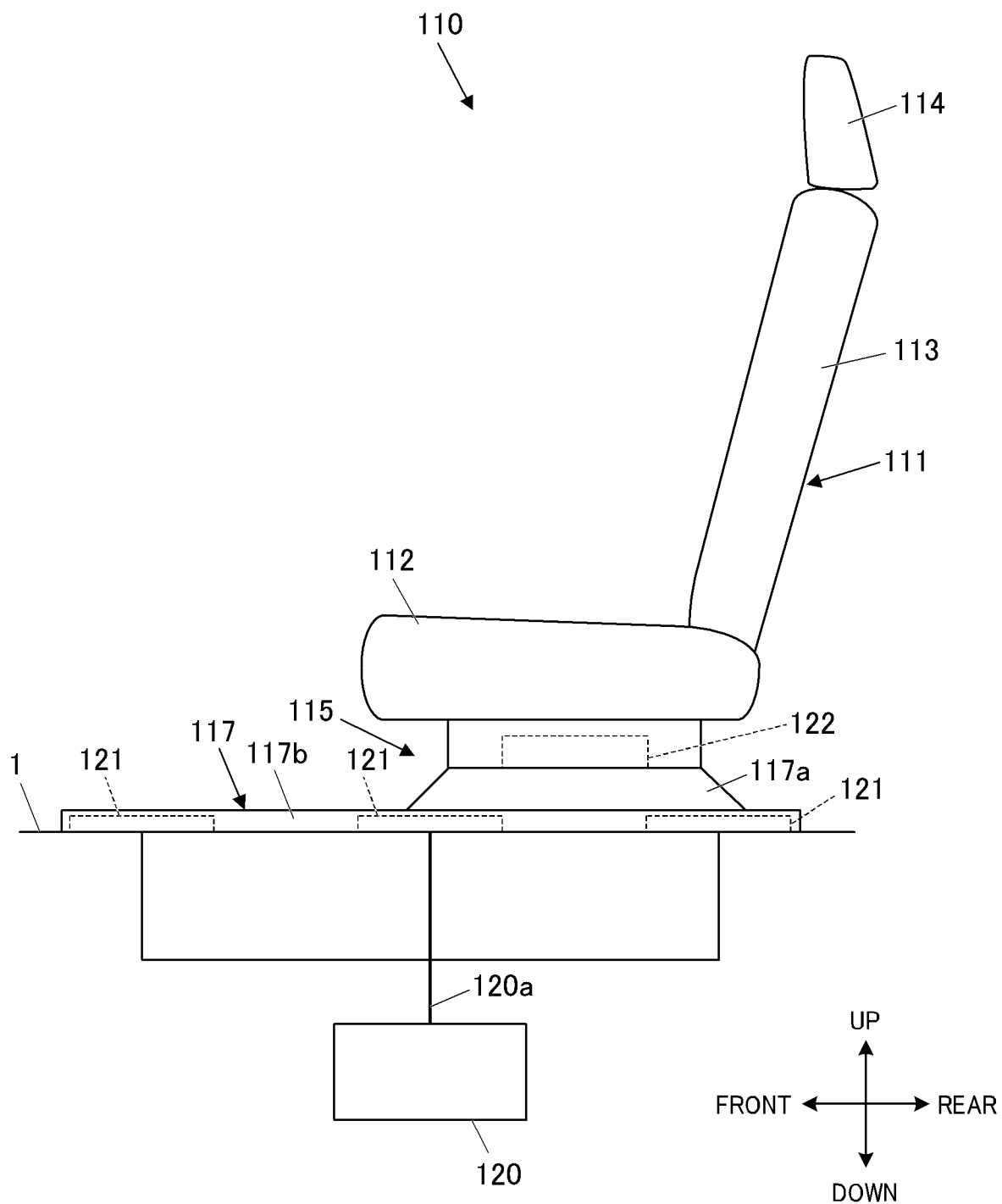
FIG. 10 is a lateral surface view of a seat in a second embodiment.

The reference numeral 1 in FIG. 10 shows a floor of a vehicle such as an automobile including a passenger car. A seat 110 for a person to be seated is set on the floor 1. The seat 110 in the present embodiment is a seat that slides along the length direction of a slide mechanism 117 (slide rails 117).

The seat 110 in the present embodiment is set in the passenger car. However, the present invention is not limited to this, and the seat 110 may be set in other automobiles such as a bus and a truck, or may be set in vehicles other than the automobiles such as a railroad car, a ship and an aircraft. The automobile to set the seat 110 may be an automobile which can run with switching between an automatic driving mode and a manual driving mode, and the seat 110 can rotate during the automatic driving mode and during stopping or parking in the manual driving mode.

The seat 110 includes a seat body 111 in which a person is seated, and a seat supporter 115 that supports the seat body 111 on the floor 1. The seat supporter 115 has a slide mechanism 117 for sliding the seat body 111 in the front-rear direction of the vehicle.

The slide mechanism 117 is slide rails and fixed to the floor 1. Such a slide mechanism 117 includes upper rails 117*a* attached to the body of the seat supporter 115 and lower rails 117*b* fixed to the floor 1. The lower rails 117*b* are formed to be long along the front-rear direction of the vehicle. The upper rails 117*a* can slide along the length direction of the lower rails 117*b*.

The slide mechanism 117 includes a lock mechanism not shown in the drawings, and the slide mechanism 117 can stop sliding at an arbitrary position when the lock mechanism is in the locked state and the slide mechanism 117 can perform sliding when the lock is released.

A control device (ECU: Electric Control Unit) for operating the above slide mechanism 117 and the lock mechanism and an after-mentioned reclining mechanism is provided in the seat 110, and the mechanisms including the slide mechanism 117 and the control device are communicably connected to each other.

The seat body 111 at least includes: a seat cushion 112 that supports the buttocks and the thigh of a person; a seat back 113 that serves as a backrest; and a head rest 114 that supports the head of the person. Though not shown in the drawings, the seat body 111 may include arm rests that support the arms of the person, a foot rest that supports the feet of the person; an ottoman that supports the legs of the person; a neck rest that supports the neck of the person, and the like.

A reclining mechanism not shown in the drawings is provided between the rear end of the seat cushion 112 and the lower end of the seat back 113, and the seat back 113 can be reclined with respect to the seat cushion 112. The position of the head rest 114 can be adjusted with respect to the upper end of the seat back 113 at least in the up-down direction. The position in the front-rear direction may be adjustable in addition to the position adjustment in the up-down direction.

The seat 110 includes a wireless power feeder for transmitting electric power, which was received from the power source 120 provided at an arbitrary location of the vehicle, from the floor 1 side to the seat body 111 side in a contactless manner, the wireless power feeder being provided between the floor 1 and the seat body 111.

The power source 120 is provided below the floor 1, and a battery for vehicle (that is, auxiliary machinery battery) is used, for example. However, the present invention is not limited to this, and a battery for running of a hybrid car and a battery dedicated for the power source 120 may be used.

The wireless power feeder includes: a plurality of power transmitters 121 that are provided at intervals to the lower rails 117b in the slide mechanism 117 and connected to the power source 120 via a harness 120a including an electric wire; and a power receiver 122 that is provided in the seat body 111 or the seat supporter 115 and receives electric power transmitted from the power transmitter 121.

The power feeding method by the wireless power feeder is what is called an electromagnetic induction method, and the power transmitters 121 and the power receiver 122 are respectively power transmitting coils and a power receiving coil. When an alternating current flows from the power source 120 to the power transmitters 121, a magnetic field is generated between any of the power transmitters 121 and the power receiver 122. When the power receiver 122 receives the magnetic field, an induced voltage is generated on the power receiver 122 side, and an electric current is generated.

The power transmitters 121 are provided at intervals to the lower rails 117b in the slide mechanism 117 as described above. Furthermore, the power transmitters 121 are arranged avoiding running positions of the upper rails 117a with respect to the lower rails 117b.

The power receiver 122 is provided in the seat body 111 or the seat supporter 115 as described above. In the present embodiment, the power receiver 122 is provided in the body of the seat supporter 115. However, the present invention is not limited to this, and the power receiver 122 may be provided in the upper rail(s) 117a of the slide mechanism 117 in the seat supporter 115. When the power receiver 122 is provided in the seat body 111, the power receiver 122 may be provided in the seat cushion 112.

The power receiver 122 is connected to the slide mechanism 117 in the seat supporter 115, and the reclining mechanism with a harness (not shown in the drawings) including an electric wire, and power supply to each of the mechanisms can be performed. That is, the power receiver 122 functions as a power distributer. Each of the mechanisms including the slide mechanism 117 that received the power supply from the power receiver 122 is controlled by the above mentioned control device to operate as needed.

To describe in more detail the positional relationship between the power transmitters 121 and the power receiver 122 in the present embodiment, any of these power transmitters 121 and the power receiver 122 are arranged in a state of always overlapping with each other as viewed from above or below. In other words, any of the power transmitters 121 and the power receiver 122 overlap with each other as viewed from above or below both during sliding and stopping of the seat body 111.

Figure 11:
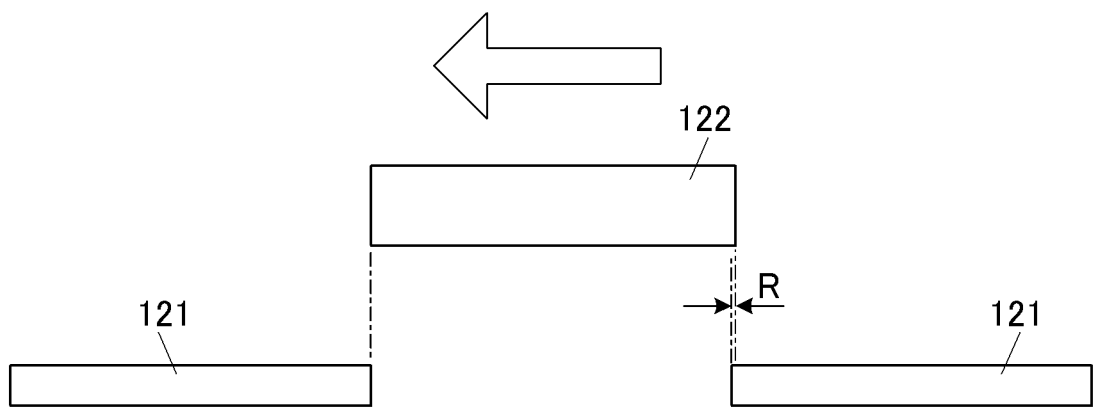
FIG. 11 is a view for explaining the positions of power transmitters and a power receiver before movement.

The power transmitters 121 and the power receiver 122 may overlap with each other for at least the minimum power receivable range R. That is, as shown in FIGS. 10 and 11, the power receiver 122 before sliding of the seat body 111 overlaps with the backmost power transmitter 121 among the power transmitters 121 for at least the minimum power receivable range R.

Figure 12:
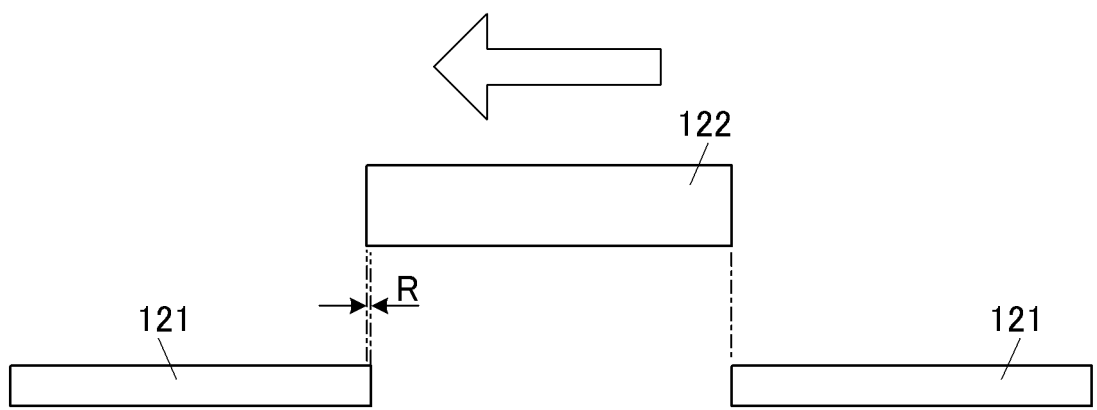
FIG. 12 is a view for explaining the positions of the power transmitters and the power receiver after movement.

As shown in FIG. 12, the power receiver 122 after the seat body 111 slid overlaps with the power transmitter 121 located before the backmost power transmitter 121 among the power transmitters 121 for at least the minimum power receivable range R. That is, the power receiver 122 moves accompanying the sliding of the seat body 111. The power receiver 122 overlaps with one power transmitter 121 for at least the minimum power receivable range R before the movement, and the power receiver 122 overlaps with another power transmitter 121, which is adjacent to the one transmitter 121 at an interval, for at least the minimum power receivable range R after the movement. That is, the transmission of electric power from the power transmitter 121 to the power receiver 122 is not interrupted, and wireless power feeding can be performed at any position even when the seat body 111 slides.

Furthermore, when a single power receiver 122 and a plurality of power transmitters 121 are provided as in the present embodiment, the interval between the power transmitters 121 is set to be shorter than the length (length along the movement direction of the seat body 111) of the power receiver 122. In other words, the length of the power receiver 122 is set to be longer than the interval between the power transmitters 121 for the minimum power receivable range R. The length of each of the power transmitters 121 along the movement direction of the seat body 111 is equal to the length of the power receiver 122 along the movement direction of the seat body 111.

The minimum power receivable range R indicates the minimum range of overlapping of the power transmitter 121 and the power receiver 122 (state in which the power transmitter 121 and the power receiver 122 are overlapping with each other) that is required when the power receiver 122 receives electric power from the power transmitter 121 along the movement direction of the seat boy 111. The minimum power receivable range R in the present embodiment is approximately 1 millimeter. In other words, the power receiver 122 can receive electric power when the power receiver 122 overlaps with any of the power transmitters 121 for at least the minimum power receivable range R.

The embodiment disclosed herein is not intended to limit the present invention but are merely examples in every respect. The scope of the present invention should be interpreted not by the embodiments above but by the scope of claims below, and is intended to include equivalents in meaning of the scope of claims and any changes within the scope of claims.

CONFIGURATION EXAMPLES

Hereinafter, configuration examples 8 to 13 in the second embodiment will be described. The configuration examples described below may be combined when the combinations are possible. In each of the configuration examples below, as for the elements common to the above second embodiment, the common reference numerals are provided and the explanation thereof is omitted or simplified.

Configuration Example 8

Figure 13:
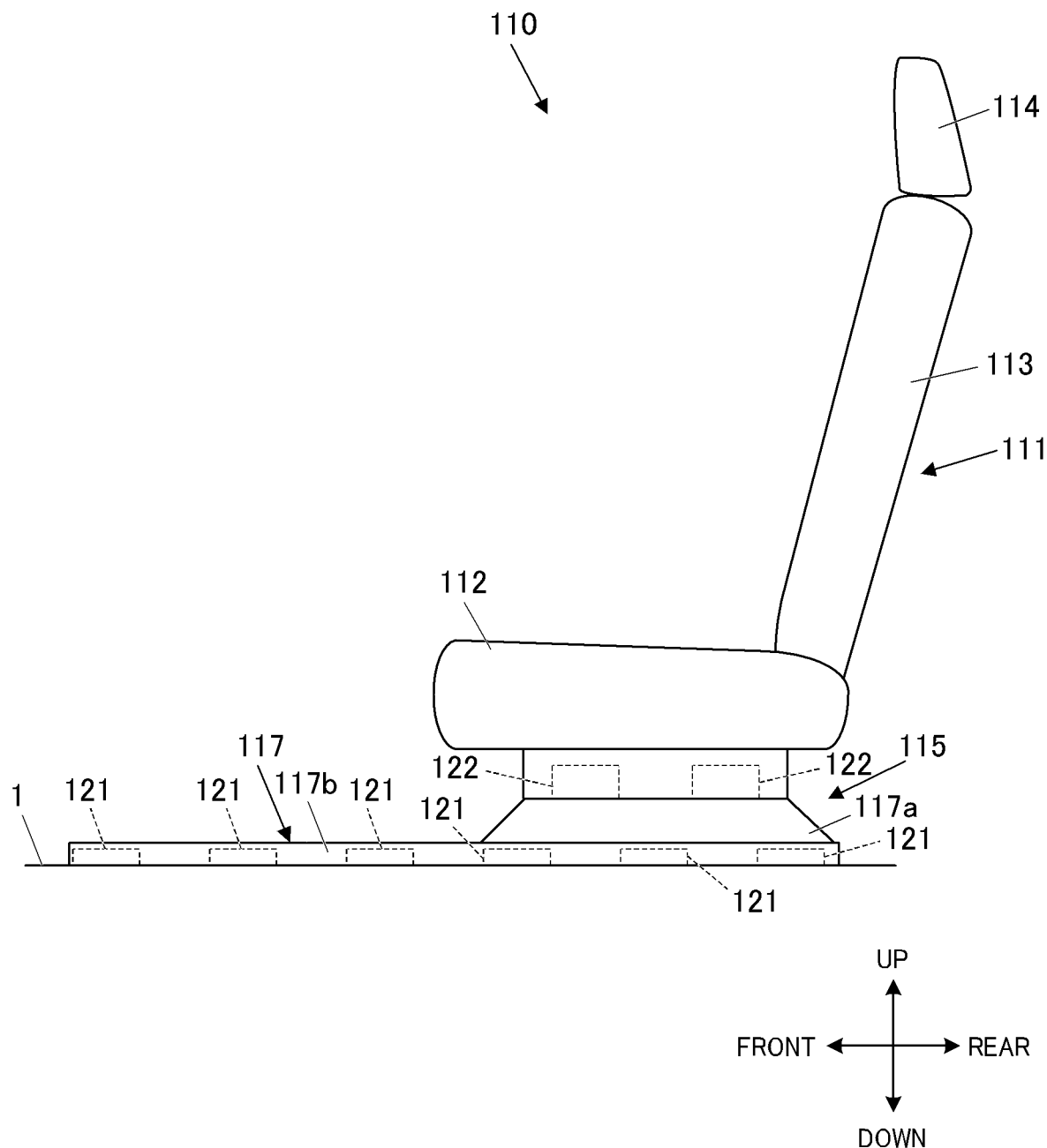
FIG. 13 is a lateral surface view of a seat in a configuration example 8.

In the seat 110 shown in FIG. 13, similarly to the above embodiment, the seat body 111 slides in the front-rear direction of the vehicle by the slide mechanism 117, and the seat 110 includes a plurality of power transmitters 121 and a plurality of power receivers 122 as a wireless power feeder. The length (L1) of each of the power transmitters 121 along the movement direction of the seat body 111 is equal to the length L1 of each of the power receivers 122 along the movement direction of the seat body 111.

In the present modification example, the interval S1 between the power transmitters 121 is set to be longer than the length L1 of each of the power receivers 122 along the movement direction of the seat body 111. The interval S2 between the power receivers 122 is set to be a different length from the interval S1 between the power transmitters 121. In the present configuration example, the interval S2 between the power receivers 122 is set to be a little longer than the interval S1 between the power transmitters 121. However, the present invention is not limited to this, and the interval S2 may be set to be shorter.

To describe in more detail the positional relationship between the power transmitters 121 and the power receivers 122 in the present configuration example, these power transmitters 121 and the power receivers 122 are arranged in a state in which the power transmitters 121 and the power receivers 122 always overlap with each other as viewed from above or below. In other words, the power transmitters 121 and the power receivers 122 overlap with each other as viewed from above or below during both the sliding and the stopping of the seat body 111.

Figure 14:
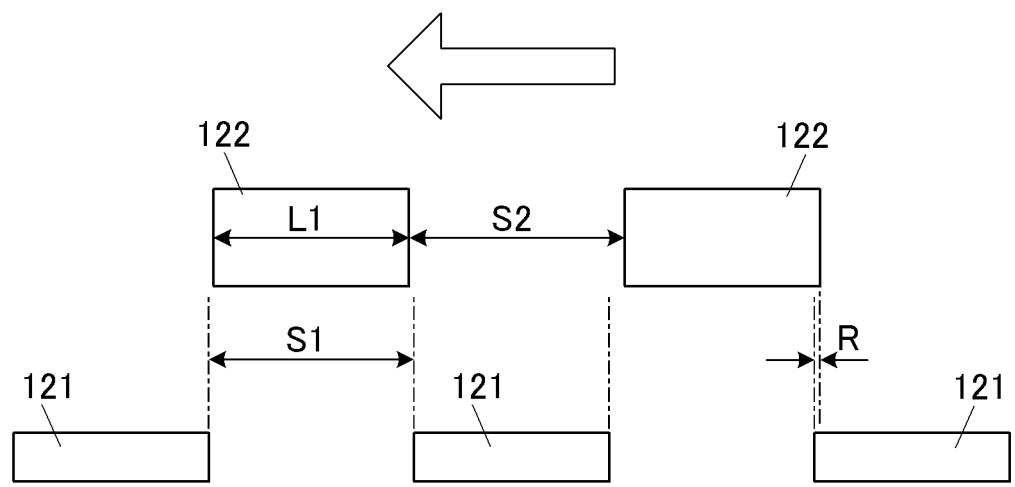
FIG. 14 is a view for explaining the positions of power transmitters and power receivers before movement.

As for the overlapping of the plurality of the power transmitters 121 and the plurality of power receivers 122, it is sufficient that any of the power transmitters 121 and any of the power receivers 122 are in a state of overlapping with each other for at least the minimum power receivable range R. As shown in FIGS. 13 and 14, at least one of the power receivers 122 before sliding of the seat body 111 overlaps with any of the power transmitters 121 for at least the minimum power receivable range R.

Figure 15:
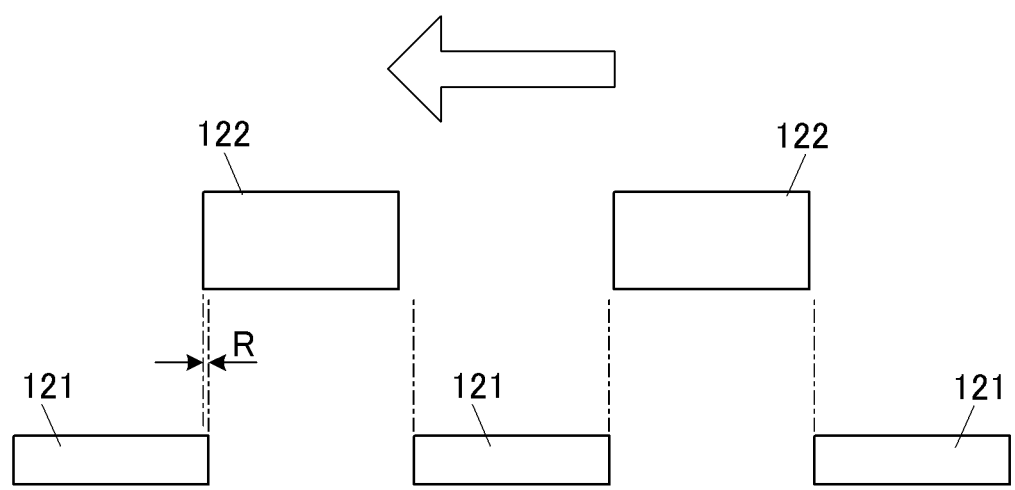
FIG. 15 is a view for explaining the positions of the power transmitters and the power receivers after movement.

As shown in FIG. 15, after the seat body 111 slides, the power receiver 122 located ahead overlaps with the power transmitter 121 located two power transmitters 121 before the aftermost power transmitter 121 among the power transmitters 121 for the minimum power receivable range R.

Configuration Example 9

Figure 16:
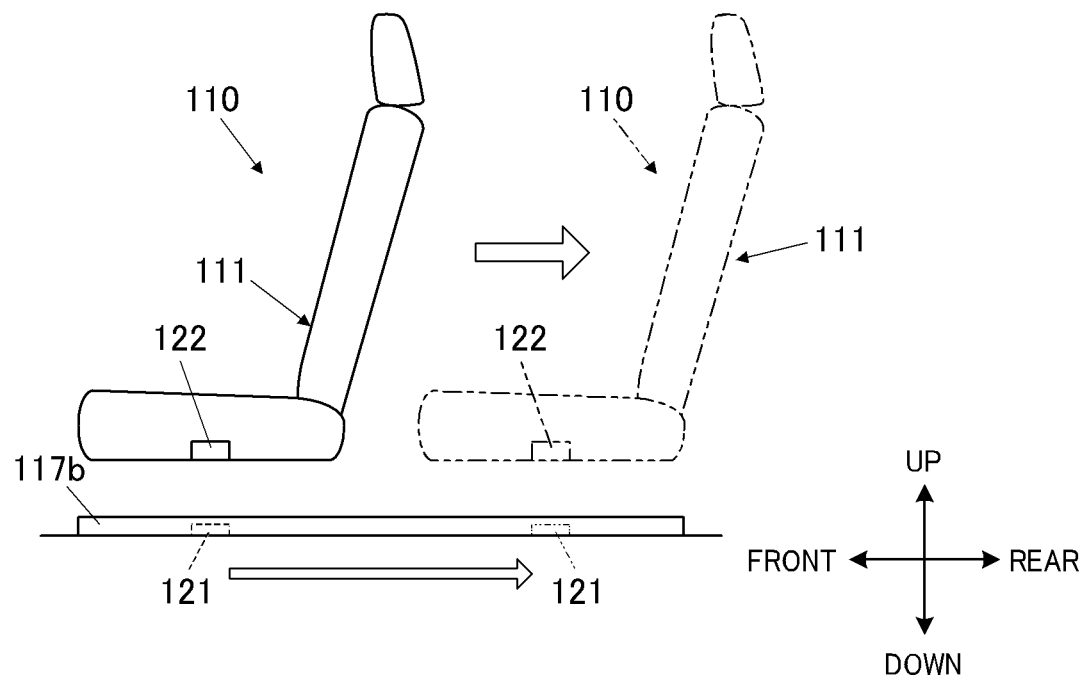
FIG. 16 is a view for explaining another example of the positions of the power transmitter and the power receiver.

The seat 110 show in FIG. 16 has a configuration in which the power transmitter 121 follows the movement of the power receiver 122 accompanying the sliding of the seat body 111. To achieve this configuration, the lower rails 117b of the slide mechanism 117 are provided with a following movement mechanism (not shown in the drawings) for the power transmitter 121 that follows the movement of the power receiver 122. Thus, the power transmitter 121 can always supply electric power to the power receiver 122.

The motion power of the following movement mechanism causing the power transmitter 121 to follow and move can be obtained from the power source 120, and the control when the power transmitter 121 follows the movement of power receiver 122 may be performed by the above control device or a control device (ECU device) provided on the vehicle side, or may be performed by cooperation between the control devices.

Configuration Example 10

Figure 17:
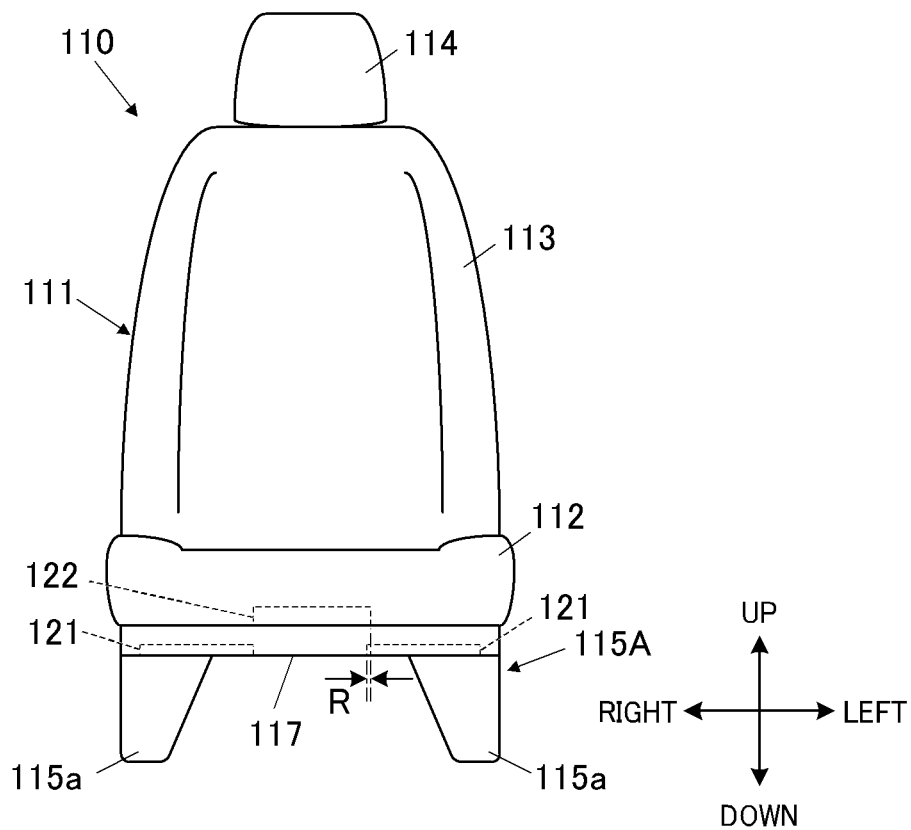
FIG. 17 is a view for explaining another example of the positions of the power transmitters and the power receiver.

In the seat 110 shown in FIG. 17, the seat supporter 115A includes: a plurality of legs 115a that are fixed to the floor 1; and a lateral slide mechanism 118 that is provided to the legs 115a for enabling the seat body 111 to slide in a left-right direction.

The lateral slide mechanism 118 is slide rails and includes: upper rails that are integrally provided with the seat cushion 112; and lower rails 118b that are fixed to the floor 1. The lower rails 118b are formed to be long along the left-right direction of the vehicle. The upper rails can slide along the length direction of the lower rails 118b.

The lateral slide mechanism 118 includes a lock mechanism not shown in the drawings, and the lateral slide mechanism 118 can stop sliding at an arbitrary position when the lock mechanism is in the locked state and the lateral slide mechanism 118 can perform sliding when the lock is released. Furthermore, a control device (ECU: Electric Control Unit) for operating the lateral slide mechanism 118 and the lock mechanism and the reclining mechanism is provided in the seat 110, and the mechanisms including the lateral slide mechanism 118 and the control device are communicably connected to each other.

The plurality of power transmitters 121 are provided at intervals in the lower rails 118b of the lateral slide mechanism 118. The power receiver 122 is provided in the upper rails incorporated into the seat cushion 112. Any of the power transmitters 121 and the power receiver 122 are arranged in a state of always overlapping with each other for at least the minimum power receivable range R as viewed from above or below. In other words, any of the power transmitters 121 and the power receiver 122 overlap with each other for at least the minimum power receivable range R as viewed from above or below during both lateral sliding and stopping of the seat body 111.

According to the present configuration example, the power receiver 122 moves accompanying the lateral sliding of the seat body 111. The power receiver 122 overlaps with one of the power transmitters 121 for at least the minimum power receivable range R before movement, and the power receiver 122 overlaps with another power transmitter 121, which is adjacent to the one transmitter 121 at an interval, for at least the minimum power receivable range R after movement.

Configuration Example 11

Figure 18:
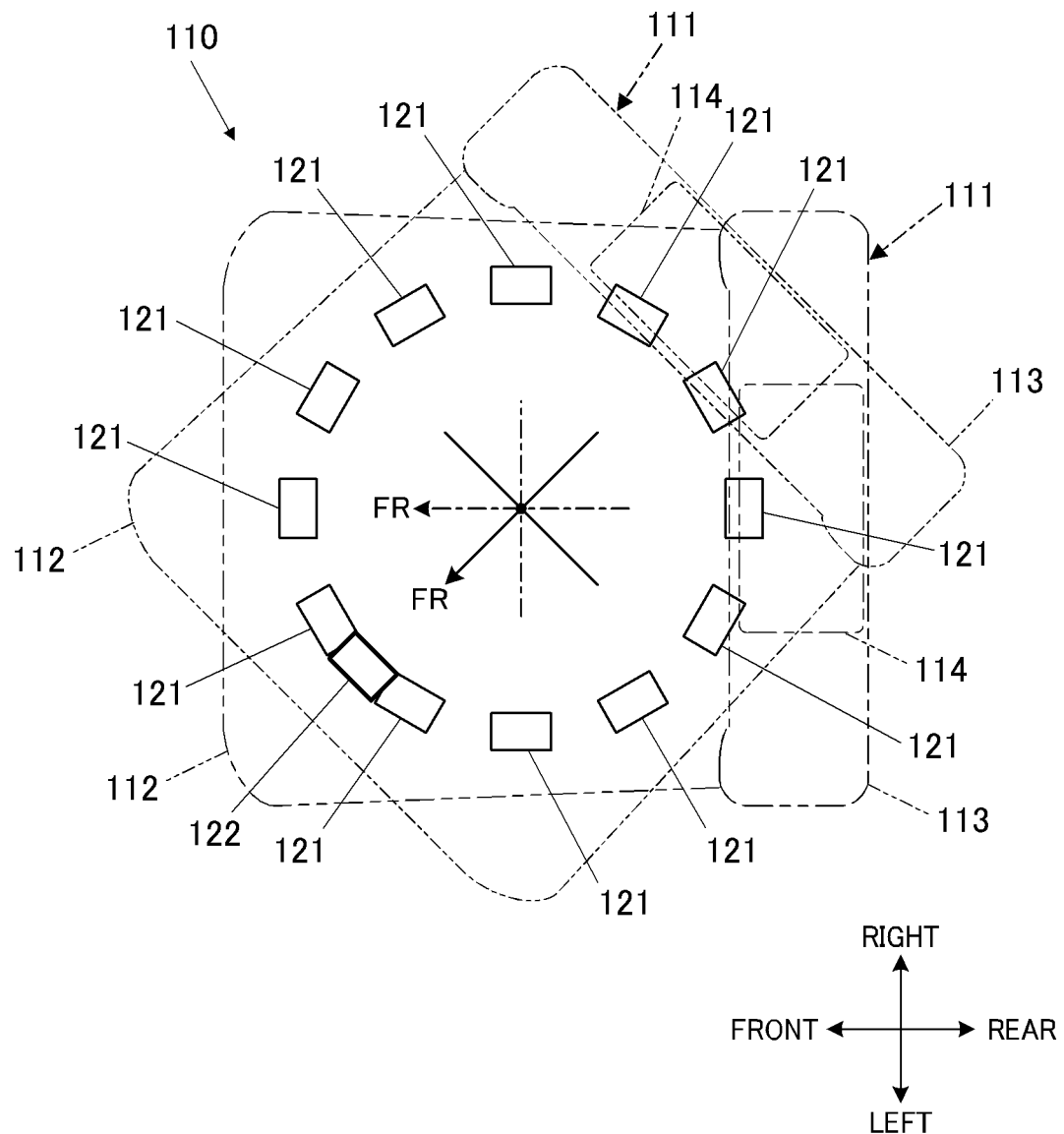
FIG. 18 is a view for explaining another example of the positions of the power transmitters and the power receiver.

The seat 110 shown in FIG. 18 is a rotary seat which rotates in a lateral direction (for example, horizontally rotates) with respect to the floor 1 around the rotation axis A. The seat supporter 115 has a rotation mechanism (not shown in the drawings) for rotating the seat body 111 in the lateral direction. The rotation mechanism includes a lock mechanism, and the rotation mechanism can stop the rotation at an arbitrary position when the lock mechanism is in the locked state, and the rotation mechanism can perform rotation when the lock is released.

The rotation axis A of the rotation mechanism in the seat supporter 115 is located in the center of the seat cushion 112, and the seat body 111 rotates in a lateral direction around the rotation axis A. In the present embodiment, a door of the vehicle is provided on the right side of the seat 110, and another seat is set on the left side. In this case, the seat body 111 rotates toward the left side.

The seat 110 includes a wireless power feeder for transmitting electric power received from the power source 120 provided at an arbitrary location of the vehicle from the floor 1 side to the seat body 111 side in a contactless manner, the wireless power feeder being provided between the floor 1 and the seat body 111.

The wireless power feeder includes: power transmitters 121 that are provided below the floor 1 and connected to the power source 120 via a harness 120a including an electric wire; and a power receiver 122 that is provided in the seat body 111 and receives electric power transmitted from the power transmitters 121.

The power receiver 122 is provided on the lower surface side of the front end of the seat cushion 112 in the seat body 111. The power transmitters 121 are provided at intervals along a circular orbit for rotation of the seat body 111 under the seat cushion 112 in the lower side of the floor 1.

In the cross arrow described in FIG. 18, the line indicating the front-rear direction of the seat cushion 112 and the line indicating the left-right direction cross each other, and the tip of the arrow (indicated by "FR") indicates the direction where the front end of the seat body 111 exists. In FIG. 18, the line indicating the front-rear direction in the cross arrow is identical to the central line passing through the center in the left-right direction in the seat cushion 112. The cross arrow of chain double-dashed line indicates the direction before movement of the seat body 111, and the cross arrow of the solid line indicates the direction after movement of the seat body 111.

To describe in more detail the positional relationship between the plurality of power transmitters 121 and the power receiver 122 in the present configuration example, when the seat body 111 makes 360-degree rotation, the power receiver 122 performs circular movement accompanying the 360-degree rotation. The power transmitters 121 are arranged along the orbit of the circular movement of the power receiver 122. The interval between the power transmitters 121 is set to be shorter than the length (length along the movement direction of the seat body 111) of the power receiver 122. Any of the power transmitters 121 and the power receiver 122 are arranged in a state of always overlapping with each other for at least the minimum power receivable range R as viewed from above or below.

Thus, unless the seat body 111 is interfered with by any other portion in the vehicle body, the seat body 111 can make 360-degree rotation, and the person seated in the seat 110 can turn his/her body sideward and backward. Thus, it is possible to see views through windows on lateral and back sides of the vehicle and face and communicate with people sideward and backward.

The rotation angle of the seat body 111 is limited to be smaller than 360 degrees on the basis of the positional relationship with other portions in the vehicle body in some cases. In such a case, the number and the interval of power transmitters 121 are modified to be the number and the interval corresponding to the rotation angle of the seat body 111 as needed.

Configuration Example 12

The power transmitters 121 and the power receiver 122 may be provided with any different function from the wireless power feeding. The power receiver 122 in the seat 110 of the present configuration example is provided with a heating function. That is, the seats 110 shown in FIGS. 19 and 20 include, as the power receiver 122, one or a plurality of heating wires 119 that are wound to be coiled and generates heat by being energized. The heating wire(s) 119 is embedded in the cushion pad of the seat cushion 112 in the seat 110, and functions as a seat heater. Such a heating wire 119 is a coil (planar coil), and generates a magnetic field with the power transmitter 121 and can generate an induced voltage by receiving the magnetic field. Thus, the heating wire 119 can generate an electric current.

The control of the power receiving mode and the heating mode (mode switching) of the heating wire 119 can be performed by the above control device (ECU device). That is, the control is performed to switch the mode to the power receiving mode of receiving electric power from the power transmitter 121 when the seat body 111 is to slide or rotate, and to switch the mode to the heating mode when the seat cushion 112 is to be warmed.

In more detail, though electric power from the power transmitter 121 is received in both of the power receiving mode and the heating mode, energization to the heating wire 119 is not performed in the power receiving mode, and energization to the heating wire 119 is performed in the heating mode. That is, the heating mode is a mode of performing energization to the heating wire 119 while receiving electric power from the power transmitter 121 (that is, distribution of electric power as the function of power receiver can be performed). Such switching of energization is performed by the above control device.

Figure 19:
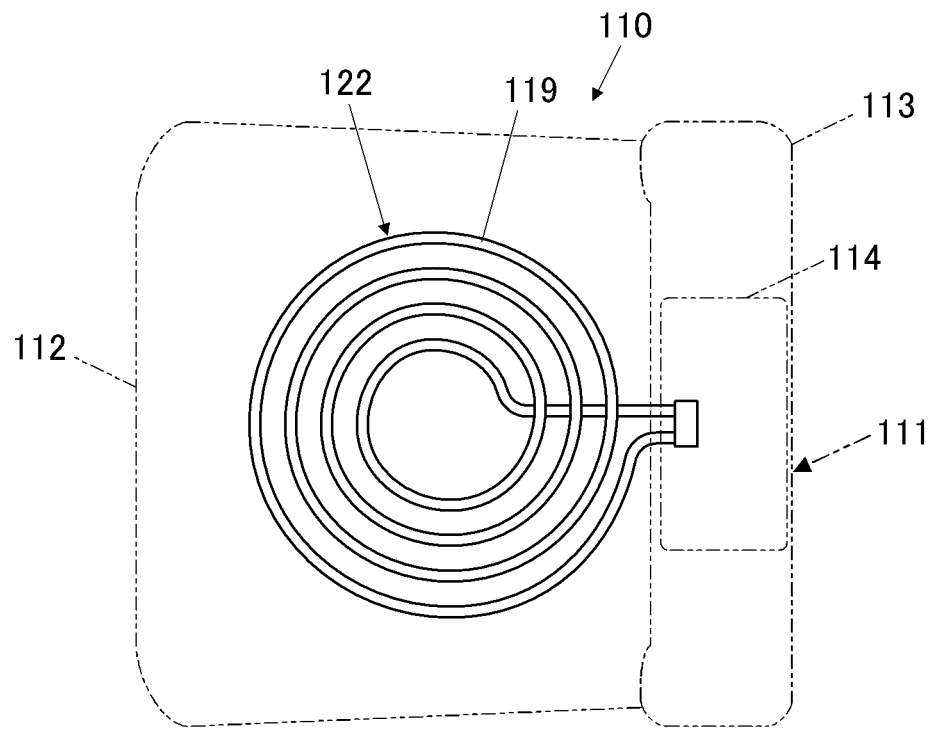
FIG. 19 is a view for explaining a case where the power receiver has another function.

A single heating wire 119 as shown in FIG. 19 is preferable since it is possible to suppress the number of parts when the warming range is broadened by increasing the area. When a plurality of heating wires 119 are provided as shown in FIG. 11, a plurality of positions in the seat cushion 112 can be warmed, and thus it is possible to disperse warm points.

Figure 20:
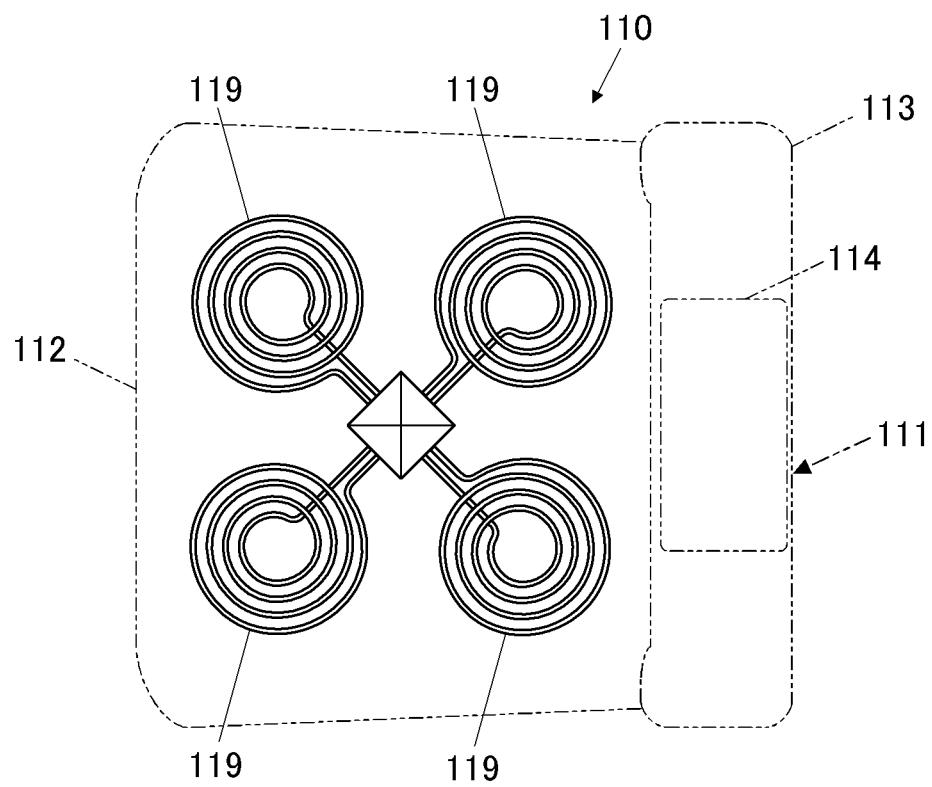
FIG. 20 is a view for explaining a case where the power receiver has another function.

The shape of heating wire 119 is not limited to a circle in a plan view as shown in FIGS. 19 and 20, and may be a shape close to a rectangle in a plan view so as to correspond to the shape of seat cushion 112.

Configuration Example 13

The above embodiment and the configuration examples have been described for a pattern in which the number of power transmitters 121 is larger than the number of power receiver(s) 122. However, the present invention is not limited to this, and the number of power receivers 122 may be larger than the number of power transmitter(s) 121. Especially, in the seat 110 shown in FIGS. 17 and 18, either of the number of power transmitter(s) 121 and the number of power receiver(s) 122 may be larger than the other.

According to the above embodiment and configuration examples, the power transmitter 121 and the power receiver 122 are arranged in a state of always overlapping with each other for at least the minimum power receivable range R as viewed from above or below. Thus, since the power transmitter 121 and the power receiver 122 are in a state of overlapping with each other for at least the minimum power receivable range R at any position even when the seat body 111 moves along the floor 1 by the movement mechanism, it is possible to surely perform power feeding. Furthermore, for example, when a plurality of power transmitters 121 are arranged at intervals along the movement direction of the seat body 111, power feeding can be performed without preparing a long power transmitter. Thus, it is possible to reduce the cost related to the unnecessity of preparing a long power transmitter.

The number of at least one of the power transmitter(s) 121 and the power receiver(s) 122 is two or more. By the plurality of power transmitters 121 and/or the power receivers 122 being arranged at intervals along the movement direction of the seat body 111, the power feeding can be performed without preparing the long power transmitter and/or long power receiver. Thus, it is possible to reduce the cost.

By a plurality of power transmitters 121 being provided to the lower rails 117b (118b) in the slide mechanism 117 (118) and the power transmitters 121 being arranged at intervals in the length direction of the lower rails 117b (118b), it is possible to perform power feeding at any position even when the seat body 111 slides by the slide mechanism 117 (118), and it is possible to reduce the cost.

By the length of the power transmitter 121 along the movement direction of the seat body 111 being set to be equal to the length of the power receiver 122 along the movement direction of the seat boy 111, it is possible to make the sizes of the power transmitter 121 and the power receiver 122 equal to each other. Thus, since preparation of power transmitter 121 and power receiver 122 of different sizes is not necessary, it is possible to reduce the cost.

By the interval between the power transmitters 121 being set to be shorter than the length of the power receiver 122 along the movement direction of the seat body 111 for the minimum power receivable range R, it is possible to make the power receiver 122, which moves accompanying the seat body 111, in a state of always overlapping with the power transmitters 121 for at least the minimum power receivable range R.

By a plurality of power receivers 122 being provided and arranged at intervals S2 in the movement direction of the seat body 111 and the interval S2 between the power receivers 122 being set to have a different length from the interval S1 between the power transmitters 121, it is easy to make the power receivers 122, which move accompanying the seat body 111, in a state of always overlapping with the power transmitters 121 for at least the minimum power receivable range R.

By the power transmitter 121 being provided to the lower rails 117b and following the movement of power receiver 122 accompanying the movement of the seat body 111, it is possible to always maintain the state in which the power transmitter 121 and the power receiver 122 overlap with each other, irrespective of the arrangement positions of the power transmitter 121 and the power receiver 122.

By the movement mechanism being a rotation mechanism rotating the seat body 111 in the lateral direction, it is possible to perform power feeding at any position even when the seat body 111 is rotated in the lateral direction by the rotation mechanism, and it is possible to reduce the cost.

By at least one of the power transmitter 121 and the power receiver 122 having a different function from wireless power feeding, it is possible to provide an additional value to the wireless power feeder.

By the power receiver 122 including a heating wire(s) 119 that is wound to be coiled and generates heat by being energized, it is possible to provide a heating function to the power receiver 122.

What is claimed is:

1. A seat comprising:
   a seat body in which a person is seated;
   a seat supporter that supports the seat body on a floor; and
   a wireless power feeder that is provided between the floor and the seat body, and transmits electric power from a floor side to a seat body side in a contactless manner, the electric power being received from a power source, wherein:
   the seat supporter includes a rotation mechanism that rotates the seat body in a lateral direction,
   the wireless power feeder includes:
      a power transmitter that is provided to the floor and connected to the power source; and
      a power receiver that is provided in the seat body and receives the electric power from the power transmitter,
   the power transmitter and the power receiver are arranged in a state in which the power transmitter and the power receiver always overlap with each other as viewed from above or below,
   the power transmitter and/or the power receiver is arranged on a rotation axis of the rotation mechanism,
   one of the power transmitter and the power receiver is arranged on the rotation axis of the rotation mechanism, and the other of the power transmitter and the power receiver is arranged out of the rotation axis of the rotation mechanism, and
   the one of the power transmitter and the power receiver that is arranged on the rotation axis of the rotation mechanism is formed to have a wider area than an area of the other of the power transmitter and the power receiver that is arranged out of the rotation axis of the rotation mechanism.

2. The seat according to claim 1, wherein the seat body includes a seat cushion that supports buttocks and a thigh of the person.

3. The seat according to claim 2, wherein a rotation axis of the rotation mechanism is located on a central line passing through a center in a left-right direction in the seat cushion.

4. The seat according to claim 2, wherein the a rotation axis of the rotation mechanism is located out of a central line passing through a center in a left-right direction in the seat cushion.

5. The seat according to claim 1, wherein the seat body rotates in a range maintaining the state in which the power transmitter and the power receiver overlap with each other by the rotation mechanism.

6. The seat according to claim 1, wherein the seat supporter includes a slide mechanism that slides the seat body in a front-rear direction of the floor.

7. A method of providing a seat comprising:
   providing a seat body in which a person is seated;
   providing a seat supporter that supports the seat body on a floor; and
   providing a wireless power feeder that is provided between the floor and the seat body, and transmits electric power from a floor side to a seat body side in a contactless manner, the electric power being received from a power source, wherein:
   the seat supporter includes a rotation mechanism that rotates the seat body in a lateral direction,
   the wireless power feeder includes:
      a power transmitter that is provided to the floor and connected to the power source; and
      a power receiver that is provided in the seat body and receives the electric power from the power transmitter,
   the power transmitter and the power receiver are arranged in a state in which the power transmitter and the power receiver always overlap with each other as viewed from above or below, the power transmitter and/or the power receiver is arranged on a rotation axis of the rotation mechanism, one of the power transmitter and the power receiver is arranged on the rotation axis of the rotation mechanism, and the other of the power transmitter and the power receiver is arranged out of the rotation axis of the rotation mechanism, and the one of the power transmitter and the power receiver that is arranged on the rotation axis of the rotation mechanism is formed to have a wider area than an area of the other of the power transmitter and the power receiver that is arranged out of the rotation axis of the rotation mechanism.

\* \* \* \* \*